Aug. 1, 1933.  R. F. HATCH  1,920,747
GATHERING POOL LEVEL REGULATOR
Filed Oct. 23, 1928

Inventor
Roswell F. Hatch
by Robson D. Brown
Attorney.

Patented Aug. 1, 1933

1,920,747

UNITED STATES PATENT OFFICE 1,920,747

GATHERING POOL LEVEL REGULATOR

Roswell F. Hatch, West Hartford, Conn., assignor to Hartford-Empire Company, Hartford, Conn., a Corporation of Delaware Application October 23, 1928. Serial No. 314,377

11 Claims. (Cl. 49—62)

This invention relates to the glass feeding art, and more particularly to apparatus for maintaining an approximately constant level in a gathering pool or container from which glass is removed for forming into ware.

The glass may be removed or gathered by a suction device, which is placed in contact with the surface of the glass in the pool and into which a quantity of glass is drawn by suction. Such a suction device may be a suction mold, as employed in the well-known Owens bottle machine, or it may be a gathering cup from which the glass is delivered to a mold or other shaping instrumentality.

The invention also is applicable to a glass flow channel or forehearth which receives molten glass from a tank furnace and from which glass is fed through a discharge outlet.

An object of this invention is to provide an apparatus of the character described, in which a substantially constant glass level will be maintained irrespective of variation in the rate at which glass is removed therefrom and in which the glass level will not be changed to any great extent by changes in the temperature or other characteristics of the molten glass.

Other objects and advantages of the invention will be apparent from the following specification and a consideration of the accompanying drawing.

The various features of this invention will be best understood by a description of one embodiment thereof, such, for instance, as is shown in the accompanying drawing, in which:—

Figure 1:
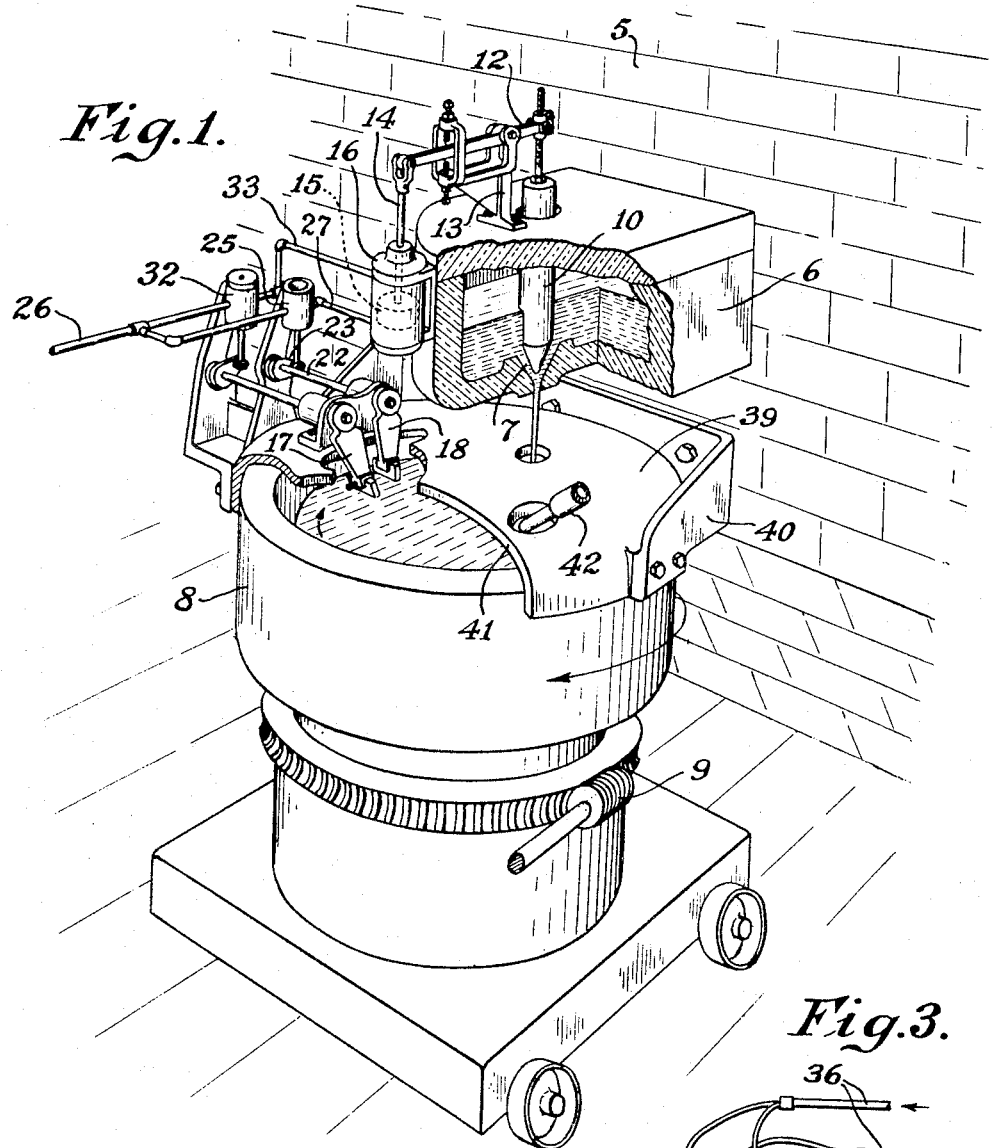
Figure 1 is a perspective view, partly in section, of the invention as arranged to cooperate with a revolving pot, such as is used with the Owens machine.

The general arrangement shown in the drawing comprises a glass melting tank, from which glass is delivered at a regulated rate, to a container in which it is desired to maintain a substantially uniform glass level. The container, as illustrated, is arranged for rotation, in which case it is commonly known as a revolving pot, but the invention may be incorporated equally well in an apparatus in which the container is stationary, the only essential feature being that the rate of delivery of molten glass from the tank or other source of supply, to the container, shall be capable of adjustment.

As shown in the drawing, a tank 5 is provided with a boot 6 having a submerged outlet 7, through which the glass flows to a revolving pot 8. The pot may be rotated in any desired manner, as, for example, by a worm and gear 9.

The rate of flow of glass to the outlet 7 is controlled by a vertically adjustable gate or valve 10, the upper end of which is secured by a screw-threaded connection to one end of a lever 12, pivoted on a fixed bracket 13. The other end of the lever is connected with a rod 14 extending from a piston 15 in a cylinder 16.

The gate 10 is adjusted vertically to increase or decrease the rate of delivery of glass to the rotary pot 8, by a pair of flow-controlled feelers 17 and 18, which are arranged to control mechanism for admitting air above or below the piston 15, thereby raising or lowering the gate 10.

The admission of air to the cylinder 16 is controlled by the angular position of these feelers as determined by the movement of the glass in the container. This movement may be produced by the rotation of a pot as shown in the drawing, or it may be produced by the flow of glass along a channel toward the point at which the glass is removed by the suction mold or other gathering device, or is discharged through an outlet. The glass flowing in contact with the feelers, exerts pressure thereon, which pressure increases as the level of the glass rises, and decreases as the level of the glass drops.

As illustrated in the drawing, there is a movement of glass in the direction of the arrow, due to the rotation of the pot 8. The feeler 18 occupies a vertical position when the glass is at the desired level as shown in full lines, as determined by a spring 20, and a stop pin 21. When the glass level rises, the lower end of the feeler 18 is swung to the right toward the position indicated by the line 28, by the increased pressure of the glass in the pot 8 thereon. The feeler is mounted on a rock shaft 22, which carries a rocker arm 23 connected with the stem 24 of a valve 25. This valve is interposed between a pipe 26 connected with a source of air pressure, and a pipe 27 leading to the lower end of the cylinder 16. The arrangement is such that the swinging movement of the feeler 18 as the glass level rises from the full line position shown in Fig. 2 opens the valve 25 and permits air to pass from the pipe 26 to the cylinder 16 below the piston 15, which thereupon moves the piston upwardly and the valve 10 downwardly. This causes a decrease in the rate of flow of glass from the outlet 7 to the gathering pool, and through the continued withdrawal of glass, returns the level to normal. The minimum flow of glass through the outlet may be adjusted by a stop screw 31 formed on the bracket 13. It is preferred that the adjustment of this stop screw shall be such that when the valve 10 is in its extreme downward position, the rate of flow to the gathering pool will be appreciably less than the rate at which glass is removed therefrom by the gathering device. This will cause the level to be lowered slowly.

Figure 2:
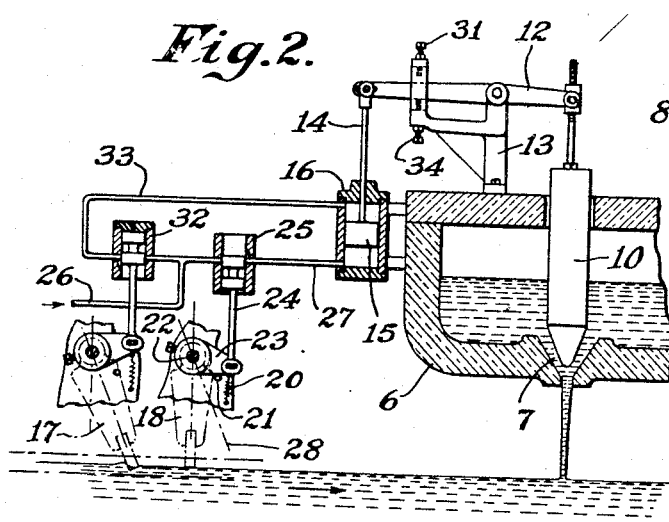
Fig. 2 is a diagrammatic view, showing more clearly the operation of the mechanism shown in Fig. 1.

The feeler 17 is so positioned that it is engaged by the surface of the glass when the glass is at its normal level, thereby holding the feeler at an angle as shown. When the glass level lowers, the pressure thereof on the feeler is decreased and the feeler is swung toward a vertical position by a spring and this acts, through connections identical with those described with reference to the feeler 18, to open a valve 32. This valve is so constructed that when it is opened air is permitted to pass from the supply pipe 26 to a pipe 33 leading to the upper side of the piston 15, in the cylinder 16. This causes the piston to be lowered until it occupies a position substantially as shown in Fig. 2, at which time the valve 10 will have been raised to an extent determined by an adjustable stop screw 34, as clearly shown in Fig. 2. The adjustment of this screw is preferably such that glass is permitted to flow to the pot at a rate in excess of that in which it is being taken therefrom, thus gradually bringing the glass level therein back to normal. The resistance to the movement of the piston 15 in the cylinder 16 may be sufficient to prevent accidental axial movement of the valve 10 from adjusted position when both the valves 25 and 32 are closed or any suitable known means may be employed to maintain the valve 10 in adjusted position at that time.

Figure 3:
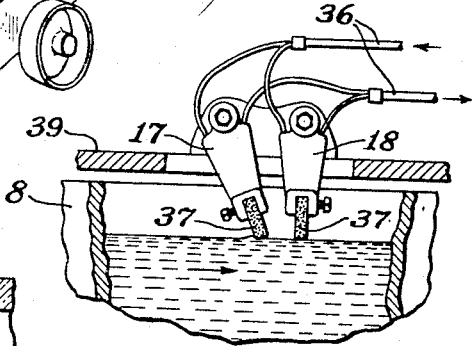
Fig. 3 is a detailed view showing the control members which are in the nature of detectors or feelers for determining variations in the glass level.

The feelers 17 and 18 may, if desired, be cooled by circulating water through a cooling system indicated at 36, in Fig. 3. That portion of the feeler which contacts with the glass may be made of any suitable material of a more or less refractory nature, such, for example, as a carbon or graphite composition which will not produce any injurious effect on the glass. This construction is indicated in Fig. 3, where graphite blocks 37 are held in the ends of the feelers by suitable clamp screws.

The container from which the glass is gathered is preferably provided with a cover, as indicated at 39 (Fig. 1), to prevent excessive radiation of heat from the glass. This cover is shown as mounted on a fixed bracket 40, and it provides a convenient place for mounting the feelers and air valves. An opening, as indicated at 41, is provided in the cover, to permit access by the suction gathering device, and another opening provides an opportunity to heat the glass in the container by means of a burner 42.

In the preceding description, and the following claims, it has been convenient to employ various terms for the nomenclature of the parts, direction of movement, and the like, but it is to be understood that these terms are not expressive of any characteristic feature of the invention, as it is obvious that changes may be made in the form or character and relation of the parts within the scope of the invention as set forth in the appended claims. For example, float mechanism responsive to the rise and fall of the glass level in the container may be employed to control valve mechanism for admitting and exhausting air to and from the cylinder 16 and the flow of glass through the outlet 7 thus may be varied according to variations in the level of glass in the container.

Having described one embodiment of the invention, what is claimed is:—

1. Apparatus for operating on molten glass, comprising a glass melting tank having a discharge outlet, a container to receive glass therefrom, means for regulating the rate of delivery of glass from the outlet to the container, means for causing glass to flow in said container, a detector adapted to engage the surface of the glass in the container, mechanism for supporting said detector for movement transversely of the glass and including means for carrying the entire weight of the detector at all times, and independently of the level of the glass in the container, and connections between the detector and the regulating means, whereby the rate of delivery of glass to the container is varied in accordance with the level of the glass therein.

2. Apparatus for operating on molten glass, comprising a glass melting tank having a discharge outlet, a container arranged to receive glass therefrom, means for regulating the rate of delivery of glass to the container, means for causing a flow of glass in the container, a detector adapted to engage the surface of the glass in the container, means for removing the detector angularly when the glass drops below a predetermined level out of normal contact therewith, and means actuated by changes in the angular position of the detector for adjusting said regulating means in accordance with the level of the glass in the container.

3. Apparatus for operating on molten glass, comprising a glass melting tank having a discharge outlet, a container arranged to receive glass therefrom, means for regulating the rate of delivery of glass to the container, a detector out of operative contact with the glass in the container, when said glass is at a desired level, a second detector in operative contact with the glass at said level, and means actuated by a change in the contacting relation between either of said detectors and the glass in the container for regulating the delivery of glass to the container.

4. Apparatus for regulating the level of molten glass in a gathering pool, comprising means for delivering glass to the pool, means for moving the glass in the pool toward a gathering point, a detector adapted to be engaged by the advancing glass, means for supporting said detector for movement transversely of the surface of the glass, the detector being in position to be so moved by the force of flow of the advancing glass thereon, and connections between the detector and the supply of glass to the pool by which the rate of delivery of said supply is regulated.

5. Apparatus for regulating the level of molten glass in a gathering pool, comprising means for delivering glass to the pool, means for moving the glass in the pool toward a gathering point, a detector, mechanism for pivotally supporting the detector in position to be moved relative to the glass to different angular positions in one direction by the force of flow of the advancing glass thereon, means for moving the detector angularly in the other direction, and connections between the detector and the supply means whereby the rate of supply of glass is varied in accordance with the angular position of the detector.

6. Apparatus for operating on molten glass, comprising a source of supply of molten glass, a rotary container, regulable means for delivering glass from the supply to the container, a detector adapted to engage the surface of the glass in the rotary container, mechanism for supporting the detector for movement transversely of the glass, whereby the detector is moved to a varying extent in response to the changes in the level of the glass, and connections between the detector and the delivery means whereby the rate of delivery of glass is regulated by the detector.

7. Apparatus for operating on molten glass, comprising a melting tank, having a submerged discharge outlet, a receptacle to which glass is delivered from said outlet, a valve movable to open and close said outlet, a detector for indicating subnormal glass level in the container, a detector for indicating supernormal glass level in the container, a motor for adjusting the valve, and connections between each of the detectors and the motor whereby the valve is adjusted upon the occurrence of abnormal glass level in the tank.

8. In combination with a source of supply of molten glass, a container to which glass may pass from said source through a flow passage and from which glass may be removed or fed, adjustable means for regulating flow of glass through said flow passage to said container, means for causing glass to flow in said container, pneumatic means for operating said flow regulating means to vary the flow of glass to said container, means adapted to engage the glass and responsive to a change of glass level in said container for controlling the operations of said pneumatic means, and means for moving the detector laterally of said container.

9. In combination, a container for molten glass from which glass is removed for fabrication into glassware, a source of supply of the molten glass arranged to discharge glass into said container, means for causing a flow of glass through the container, and flow-controlled means movable transversely of the glass by the force of flow of the glass thereon for automatically varying the discharge of glass into said container on a change of level of the glass in the container.

10. In combination, a container for molten glass from which glass is removed for fabrication into glassware, a glass tank having an outlet arranged to discharge glass into said container, means for causing a flow of glass in said container, means for regulating the discharge of glass through said outlet into said container, means held against movement when the level of the glass falls, for controlling said discharge regulating means and responsive to a rise in the glass level in the container to decrease the rate of discharge of glass through the outlet, and separate means responsive to a lowering of the glass level in the container to increase said rate of discharge.

11. In combination, a container for molten glass from which glass is removed for fabrication into glassware, a source of supply of molten glass having an outlet arranged to discharge glass into said container, a valve for regulating discharge through said outlet, means for causing a flow of glass in said container and valve adjusting mechanism including movably mounted feelers receiving lateral motion as a result of the force of flow of the glass at the glass level in the container and actuated respectively to adjust the valve toward the outlet when the glass level in the container rises beyond a predetermined level and to adjust the valve away from the outlet when the glass level in the container falls below said predetermined level, and means for imparting lateral motion to said feelers when the level of the glass falls below the lowermost portions of said feelers.

ROSWELL F. HATCH.